(12) United States Patent
Lionberg et al.

(10) Patent No.: US 6,262,560 B1
(45) Date of Patent: Jul. 17, 2001

(54) BATTERY PACK DISCHARGE RECOVERY CIRCUIT

(75) Inventors: Daniel D. Lionberg, Milwaukee; Thomas P. Becker; Daniel M. Eggert, both of Kenosha, all of WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/617,644

(22) Filed: Jul. 17, 2000

(51) Int. Cl.⁷ .................................. H02J 7/00; H02J 7/34
(52) U.S. Cl. .......................... 320/103; 320/162; 307/48
(58) Field of Search .................................. 320/103, 162; 307/48, 43, 44, 45, 150

(56) References Cited

U.S. PATENT DOCUMENTS

| 5,084,664 | 1/1992 | Gali . |
| 5,276,393 | 1/1994 | Gali . |
| 5,677,612 | 10/1997 | Campagnuolo et al. . |
| 5,686,809 | * 11/1997 | Kimura et al. ........................ 320/103 |
| 5,738,919 | 4/1998 | Thomas et al. . |
| 6,118,253 | * 9/2000 | Mukainakano et al. ............. 320/134 |

\* cited by examiner

Primary Examiner—Peter S. Wong
Assistant Examiner—Gregory J. Toatley, Jr.
(74) Attorney, Agent, or Firm—Seyfarth Shaw

(57) ABSTRACT

A charging circuit for a lead-acid battery pack includes a sacrificial battery with a voltage less than that required to charge the lead-acid battery and connected across the input terminals of a power converter, which boosts the sacrificial battery voltage to an output voltage sufficient to charge the battery pack. A processor operating under stored program control is connected across the lead-acid battery and monitors its voltage and produces an output signal when the voltage drops below a predetermined level, for triggering the power converter to apply its boosted voltage to the lead-acid battery for charging. The processor program ignores normal battery voltage conditions which occur during normal operation of an associated device powered by the lead-acid battery and will activate the power converter only when the lead-acid battery voltage has reached a significantly low level or has reached a low level for a sufficiently long period of time, to be consistent with a deep discharge condition of the lead-acid battery.

15 Claims, 2 Drawing Sheets

BATTERY PACK DISCHARGE RECOVERY CIRCUIT

BACKGROUND

This application relates to battery packs of the type used for powering cordless power hand tools and the like, and to recharge circuits for such battery packs. In particular, the application relates to battery packs incorporating lead-acid battery cells.

Lead-acid battery cells of the type used for powering cordless power tools, such as thin metal film cells, do not tolerate deep discharges. Indeed, such cells are prone to permanent damage if left in a state of deep discharge for an extended period of time.

It is known to provide recharging devices for restoring or maintaining the charge on a lead-acid battery. Some such devices incorporate an auxiliary battery which typically is of a size and capacity comparable to the battery being recharged. Such devices are not suitable for use with battery packs of the type used for powering cordless power hand tools, since such battery packs must be of a relatively small size and weight. Furthermore, during normal operation of a cordless power tool, the battery pack terminal voltage can undergo significant momentary terminal voltage drops, depending on the load on the battery. For example, when the tool is turned on, its motor may draw approximately 20 amps for a fraction of a second until it comes up to operating speed. Furthermore, in the case of an impact tool, such as an impact wrench or the like, during the impact phase the motor may draw approximately 15 amps for about five seconds, a typical fastener installation period. Similar heavy loads will be drawn during the stall phase of a nut driver or screw driver tool. During such heavy current loads, the battery terminal voltage may dip below the voltage level which would be indicative of deep discharge, even though the battery is not, in fact, in deep discharge. Thus, a deep discharge recovery circuit which relies on battery terminal voltage to indicate a deep discharge condition must be able to distinguish from these normal, momentary voltage drops.

SUMMARY

This application describes a system which avoids the disadvantages of prior battery pack recharge circuits, while affording additional structural and operating advantages.

An important feature is the provision of a circuit which can recharge a battery pack from deep discharge with the use of a recharging cell which has nominal output voltage substantially less than that of the battery pack being recharged.

Another feature is the provision of a circuit of the type set forth, which is adapted to be connected to a cordless power tool of the type powered by the battery pack and which ignores momentary battery pack voltage drops during normal operation of the tool.

A further feature is the provision of a circuit of the type set forth which is of simple and economical construction.

Certain ones of these and other features may be attained by providing a charging circuit for a lead-acid battery of a battery pack having positive and negative terminals, the circuit comprising: a processor connected across the battery and operating under control of a store program for monitoring battery voltage and generating a control signal at a control output, a power converter having power input terminals and a control input connectable to the control output and power output terminals respectively connected to the battery terminals, and a sacrificial battery cell connected across the power input terminals and having a cell voltage substantially less than that required to charge the battery, the processor being responsive to the battery voltage dropping below a predetermined level for generating the control signal, the converter being responsive to the control signal for increasing the cell voltage to an output voltage sufficient to charge the battery and for providing the output voltage at the power output terminals.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

Figure 1:
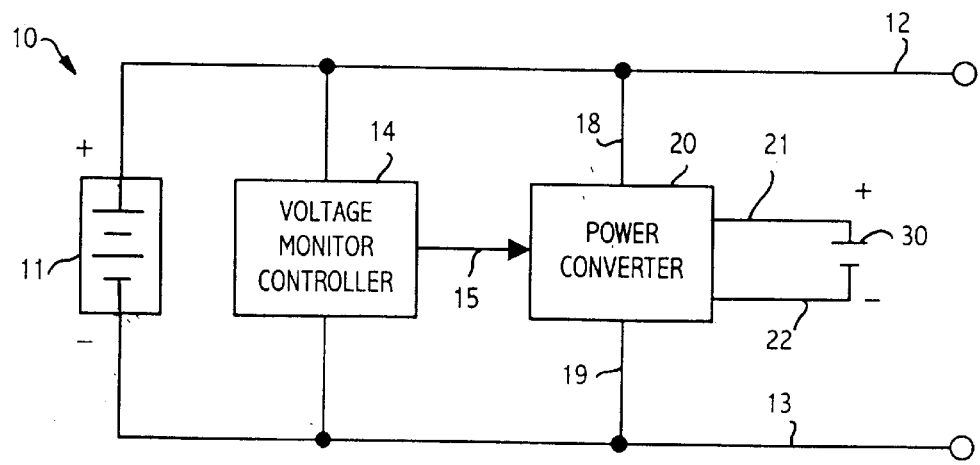
FIG. 1 is a partially schematic and partially functional block diagram of a deep discharge recovery circuit connected to an associated battery pack.
Figure 2:
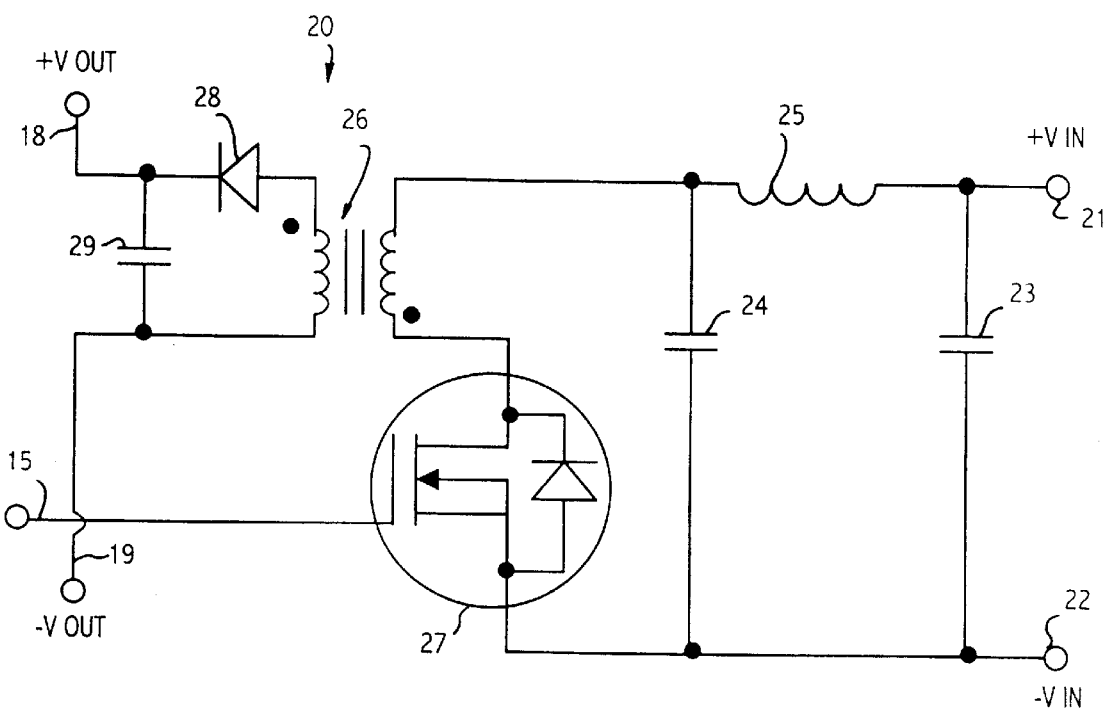
FIG. 2 is a schematic circuit diagram of the power converter of the circuit of FIG. 1.

Referring to FIG. 1, there is illustrated a charging circuit, generally designated by the numeral 10 for charging a battery pack 11, which may include one or more lead-acid battery cells, and has positive and negative terminals 12 and 13, respectively. The circuit 10 includes a voltage monitor/controller 14 connected across the terminals 12, 13 and which operates under control of a stored program. The voltage monitor/controller 14 maybe a microcontroller of any of a number commercially available types, and has a control output connected at 15 to a control input of a power converter 20 which is connected across the terminals 12, 13. More specifically, the power converter 20 has positive and negative power output terminals $18(+V_{out})$ and $19(-V_{out})$ respectively connected to the terminals 12 and 13. The power converter 20 also has power input terminals $(21(+V_{in})$ and $22(-V_{in})$ The power converter 20 is a DC/DC converter and maybe a MOSFET voltage step-up oscillator circuit of the type illustrated in FIG. 2. A DIP-packaged commercially available version of such a circuit is sold by Datel, Inc. under its XWR Series. Referring to FIG. 2, the power converter 20 includes an input pi filter connected to the voltage input terminals 21–22, and including shunt capacitors 23 and 24 and a series inductor 25. The converter also includes a step-up transformer 26, having a primary winding connected in series with the inductor 25 and with a MOSFET 27, the MOSFET 27 having a control gate terminal connected to the control input at 15. The secondary winding of the transformer 26 is connected in series with a rectifying diode 28 across the voltage output terminals 18, 19. A filter capacitor 29 is also connected across the terminals 18, 19.

When a control signal is present at the control input at 15, the MOSFET 27 is conductive, allowing current to flow through the primary winding of the transformer 26, which serves to step up the input voltage input terminals 21, 22 to a higher output voltage level across the output terminals 18, 19. In this regard, the charging circuit 10 also includes a sacrificial battery cell 30 connected across the voltage input terminals 21, 22 of the power converter 20. The sacrificial cell 30 could be a rechargeable cell, such as a lead-acid cell, or a replaceable cell, such as an alkaline cell, but it will have a nominal output voltage substantially less than that required to charge the battery pack 11. For example, if the nominal no-load voltage of the battery pack is 12.6 volts, the sacrificial cell 30 may have a nominal no-load voltage as low as 1.5 volts.

In the illustrated embodiment, the control signal at the control output of the voltage monitor/controller 14 is a pulse-width-modulated oscillatory signal. The pulse width is controlled by the program of the voltage monitor/controller 14 in response to the voltage level appearing at the output terminals 18, 19, so as to provide a regulated output voltage of a desired level sufficient to charge the battery pack 11. Alternatively, the control signal could simply be a trigger signal which triggers the operation of a PWM controller circuit which may form a part of the power converter 20, such arrangements being included in the aforementioned Datel converter circuits.

Typically, the battery pack terminals 12, 13 are connected through a suitable trigger switch arrangement to the motor of an associated power hand tool (not shown), so that when the trigger switch is actuated the battery pack 11 powers the tool, all in a well-known manner. In this case, the charging circuit 10 may be built into the associated power tool. The voltage monitor/controller 14 may operate in a "sleep mode," wherein it is normally inactive and becomes active for a short period of time, periodically and/or in response to a predetermined stimulus, such as a predetermined change in the voltage level at the terminals 12, 13, of the type which occurs when the battery pack 11 is loaded by the tool motor. Thus, the charging circuit 10 places a minimal drain on the battery pack 11.

Figure 3:
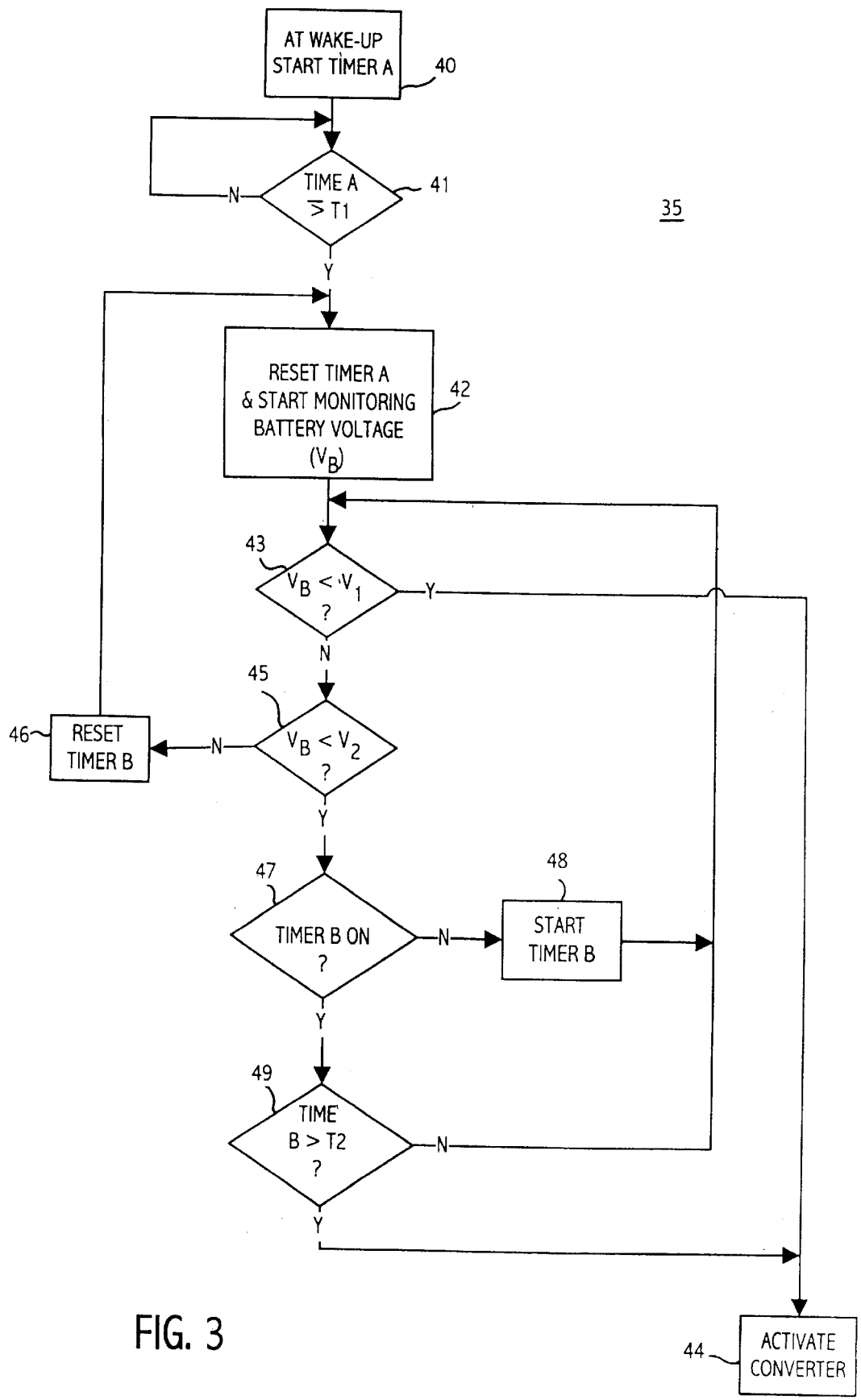
FIG. 3 is a flowchart of a software routine for controlling the operation of the circuit of FIG.

Referring to FIG. 3, there is illustrated a flow chart of a program routine of the voltage monitor/controller 14 for controlling operation of the power converter 20. Thus, at 40, at wake-up of the voltage monitor/controller 14, it starts a timer A and then checks at 41 to see if the timer A is greater than or equal to a predetermined time period T1. If not, the routine returns to 41 to continue monitoring the timer. If the time period T1 has elapsed the routine then, at 42, resets timer A and begins monitoring the battery voltage $V_B$ of the battery pack 11. The time delay introduced by the timer A may be only a fraction of a second and is sufficient for the circuitry to ignore the momentary drop in battery voltage which may occur at power-on of the tool motor. The routine next checks at 43 to see if the battery voltage is at or below a predetermined level V1, which would signify that the battery pack 11 is in a deep discharge condition. If so, the program moves immediately to 44 to activate the power converter 20 by generating the control signal at the control output at 15. This causes the power converter to immediately begin generating and applying to the battery pack 11 an output voltage sufficient to charge the battery pack 11. If, at 43, the battery voltage has not yet dropped to the V1 level, the routine next checks at 45 to see if the battery voltage is less than a higher predetermined level V2, which corresponds to a load current of the type which would typically occur during the impact phase of an impact tool. If the voltage has not yet reached the V2 level the routine resets the timer B at 46 and returns to 42 to continue monitoring the battery voltage. If, at 45, the battery voltage has dropped below the V2 level, the routine at 47 checks to see if the timer B is on. If not, the timer B is started at 48 and the routine returns to 43. If the timer B is already on, the routine checks at 49 to see if the timer B is greater than a second predetermined time period T2, corresponding to a typical fastener installation time period during the impact phase of an impact tool such as, e.g., about five seconds. If that time period has not yet expired, the routine returns to 43 to continue monitoring the voltage. If, at 49, the timer B is greater than T2, indicating that the battery voltage has been below V2 for more than the normal fastener installation period, the program again moves to 44 to activate the power converter 20. Thus, the program will ignore normal battery voltage conditions which occur during normal operation of the associated hand tool and will activate the power converter only when the battery voltage has reached a significantly low level or has reached a low level for a sufficiently long period of time, to be consistent with a deep discharge condition of the battery pack 11.

Because of the use of a microcontroller operating under control of a stored program, the charging circuit 10 uses a minimal number of components and can be readily reprogrammed to accommodate diverse tool sizes or power ranges. However, it will be appreciated that the charging circuit could also be implemented using numerous alternative analog and/or digital electronic hardware configurations. While, in the illustrated embodiment, the power converter 20 is a MOSFET voltage step-up oscillator circuit, the converter function could also be implemented using suitable bipolar solid-state devices capable of handling the required currents and voltages.

From the foregoing, it can be seen that there has been provided an improved charging circuit which monitors the condition of an associated lead-acid battery pack and, when it reaches a deep discharge condition, permits it to be recharged by the use of a sacrificial cell of a size and capacity substantially smaller than that normally required for charging the battery pack.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims, when viewed in their proper perspective based on the prior art.

We claim:

1. A charging circuit for a lead-acid battery of a battery pack having positive and negative terminals wherein the lead-acid battery is subject to damage from deep discharge and has a capacity sufficient for jump-starting an automotive vehicle, the circuit comprising:

a processor connectable across the battery and operating under control of a stored program for monitoring battery voltage and generating a control signal at a control output, a power converter having power input terminals and a control input connectable to the control output and power output terminals respectively connected to the battery terminals, and a sacrificial battery connected across the power input terminals and having a voltage substantially less than that required to charge the lead-acid battery, the processor being responsive to the lead-acid battery voltage dropping below a predetermined level indicative of a deep discharge condition for generating the control signal, the converter being responsive to the control signal for increasing the voltage of the sacrificial battery to an output voltage sufficient to charge the lead-acid battery and for providing the output voltage at the power output terminals.

2. The battery pack of claim 1, wherein the sacrificial battery is a rechargeable battery.

3. The battery pack of claim 1, wherein the sacrificial battery is a nonrechargeable replaceable battery.

4. The battery pack of claim 1, wherein the processor is a microcontroller.

5. The battery pack of claim 1, wherein the converter is a DC/DC step-up converter.

6. The battery pack of claim 5, wherein the converter includes a step-up transformer.

7. The battery pack of claim 6, wherein the controller includes a MOSFET oscillator connected to a primary winding of the transformer and a rectifier connected to a seconding winding of the transformer.

8. The battery pack of claim 1, wherein the processor program includes a routine delaying the start of lead-acid battery voltage monitoring for a predetermined time period after activation of the processor.

9. The battery pack of claim 1, wherein the processor includes a routine which delays generation of the control signal until the lead-acid battery voltage has been below the predetermined level for a predetermined time period.

10. The battery pack of claim 9, wherein the predetermined level is a first level, the processor program including a routine for immediately generating the control signal upon the lead-acid battery voltage dropping below a second predetermined level lower than the first level.

11. The battery pack of claim 1, wherein the sacrificial battery is a single cell.

12. A method of recharging a lead-acid battery pack wherein the lead-acid battery is subject to damage from deep discharge and has a capacity sufficient for jump-starting an automotive vehicle comprising:

providing a sacrificial battery having a battery voltage substantially less than that required to charge the battery pack, applying the sacrificial battery voltage to a converter to multiply the sacrificial battery voltage to an output voltage sufficient to charge the battery pack, monitoring battery pack voltage while the battery pack is connected to a load; and applying the output voltage to the battery pack when the battery pack voltage is below a predetermined level indicative of a deep discharge condition.

13. The method of claim 12, wherein the output voltage is applied to the battery pack until the sacrificial battery is exhausted.

14. The method of claim 12, wherein the output voltage is not applied to the battery pack until the battery pack voltage has been below the predetermined level for a predetermined time period.

15. The method of claim 14, wherein the predetermined level is a first level, the output voltage being applied to the battery pack immediately upon the battery pack voltage dropping below a second level lower than the first level.

* * * * *